United States Patent [19]

Sanders

[11] 4,268,740

[45] May 19, 1981

[54] FLEX HEAD WELDING TORCH HAVING DISC SPRING BIASING ELEMENTS

[75] Inventor: Harold D. Sanders, Houston, Tex.

[73] Assignee: Central Welding Supply Co., Inc., South Houston, Tex.

[21] Appl. No.: 14,480

[22] Filed: Feb. 23, 1979

[51] Int. Cl.³ ............................................. B23K 9/16
[52] U.S. Cl. .................. 219/137.51; 219/70; 219/75
[58] Field of Search ..................... 219/137.51, 70, 75; 239/587; 285/184, 270, 261; 403/90, 138

[56] References Cited

U.S. PATENT DOCUMENTS

| | | | |
|---|---|---|---|
| 414,798 | 11/1889 | Dawes | 403/138 X |
| 982,661 | 1/1911 | Dickens | 285/261X |
| 3,360,697 | 12/1967 | Seiden | 361/294 |
| 3,909,585 | 9/1975 | Sanders | 219/137.51 |
| 3,997,116 | 12/1976 | Moen | 239/587 |

FOREIGN PATENT DOCUMENTS 473580  10/1937  United Kingdom ................ 285/270

Primary Examiner—E. A. Goldberg
Attorney, Agent, or Firm—Arnold, White & Durkee

[57] ABSTRACT

The disclosure relates to a welding torch with a flexible welding torch head. The head is in the form of a ball and socket with a fluid passage and is biased in position by disc springs which also have fluid passages.

8 Claims, 2 Drawing Figures

U.S. Patent     May 19, 1981     4,268,740
FIG.1
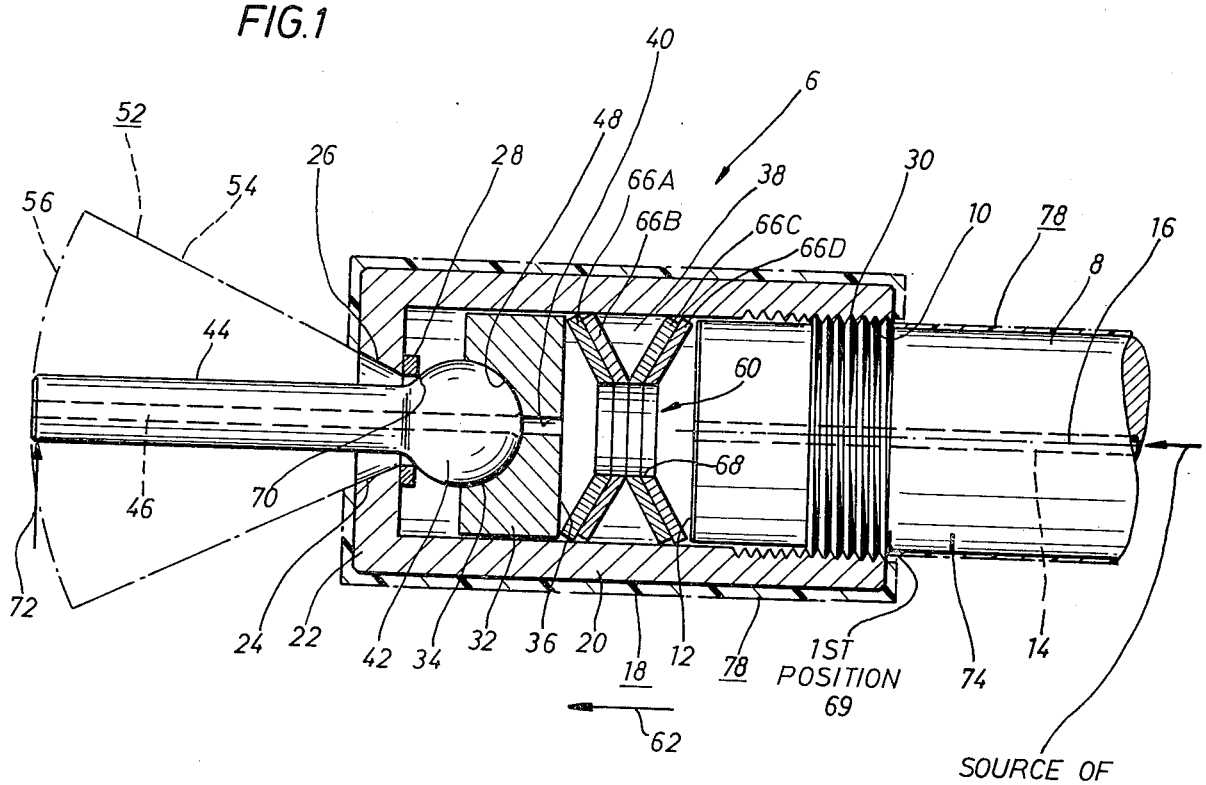
SOURCE OF PRESSURIZED AIR & ELECTRICAL POTENTIAL
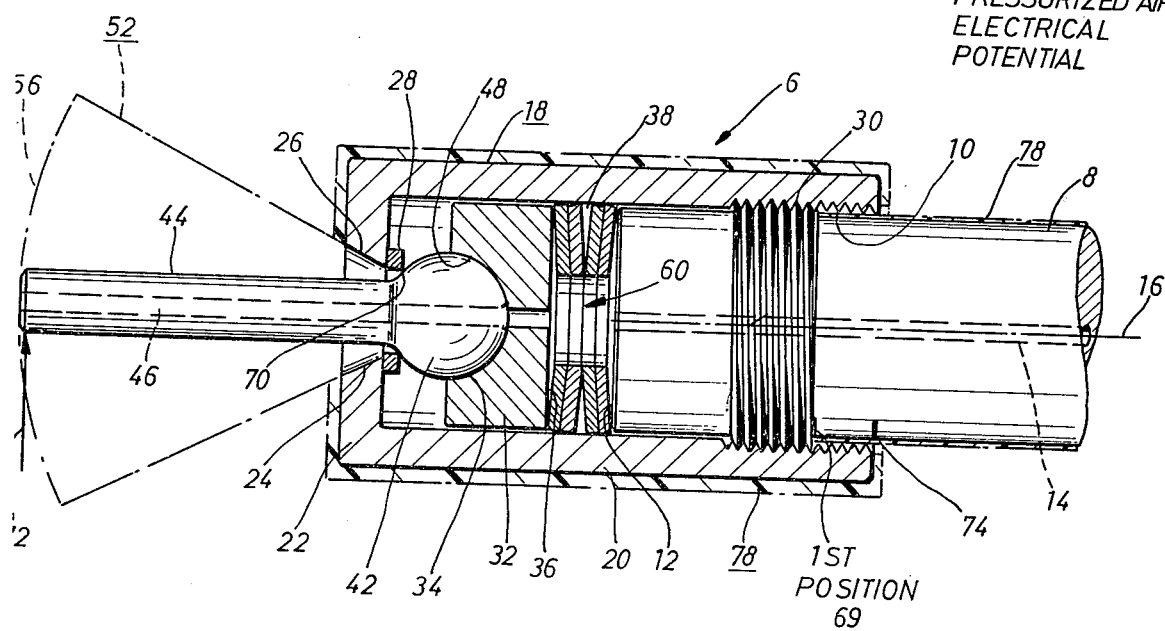
FIG.2

FLEX HEAD WELDING TORCH HAVING DISC SPRING BIASING ELEMENTS

BACKGROUND OF THE INVENTION

1. Field of the Invention

This invention relates to arc welding torches, and, in particular, to an arc welding torch having a biasing arrangement characterized by a high compression-to-length ratio, such as an array of Belleville springs.

2. Description of the Prior Art

U.S. Pat. No. 3,909,585, issued to Harold D. Sanders and Thomas C. Landreth and assigned to the assignee of the present invention, generally relates to an arc welding torch wherein a plurality of coaxially disposed ball and socket joints are provided within the body to permit the welding head to assume any predetermined angular orientation with respect to an axis through the torch. The coaxially disposed ball and socket joints are biased into abutting contact one with the other by the provision of an axially extending wire secured at one end to a stationary butt and at the other to a spring retainer. A compression spring serves to impart a biasing force to maintain a compression force on adjacent mated surfaces of the ball and socket joints.

The ball and socket joints and biasing arrangement therefor occupies approximately one-half of the axial length of the torch embodying the teachings of the above-referenced patent. It is believed advantageous to provide a welding torch wherein the head is permitted to occupy any of a wide range of angular orientations with respect to the torch axis, yet, at the same time, provide a biasing arrangement that is more compactly disposed within the torch. It is therefore believed to be of advantage to utilize a biasing arrangement characterized by a high compression-to-length ratio to snugly maintain the torch head in a predetermined angular orientation. It is believed to be of further advantage to provide a torch arrangement whereby the head may be locked in a given angular orientation.

SUMMARY OF THE INVENTION

This invention relates to a welding torch having a body member adapted for interconnection with a supply of pressurized air and a source of electrical potential. A hollow housing having an annular closure plate disposed at one end thereof is attachable to the housing, as by engaged threads, at the end thereof opposite the closure plate. The housing is movable with respect to the body from a first to a second position. The closure plate is provided with a central aperture, the aperture being bevelled with respect to the axis of the torch. A socket member is movably disposed within the housing with the socket face presented toward the aperture in the closure plate. A ball member having an elongated stem thereon is receivable within the socket face such that the stem is extendable through the central aperture in the closure plate. The ball is freely rotatable with respect to the socket face such that the stem may occupy any angular orientation with respect to the axis of the torch that lies within a substantially truncated conical envelope having a spherical bottom face. The envelope contains the bevelled surfaces of the aperture. A biasing arrangement, such as one or more Belleville springs, exhibiting a high compression-to-length ratio is disposed within the housing intermediate the socket member and the body to bias the socket and ball into abutting contact with the interior of the closure plate.

With the housing in the first position with respect to the body, the biasing force exerted by the Belleville spring arrangement snugly maintains the stem in a given angular orientation with respect to the axis of the torch. The stem is displaceable from the selected angular orientation in response to the application of an external force. However, due to the high compression-to-length characteristic of the biasing arrangement, a relatively small advancement of the housing from the first to the second position with respect to the valve body generates an increased biasing force imposed on the ball and socket to bias the ball and socket into a more secure abutting relationship with the interior of the closure plate to thereby lock the stem in a selected angular orientation and maintain the stem in that orientation despite the application of the external force thereto.

BRIEF DESCRIPTION OF THE DRAWINGS

The invention will be more fully understood from the following detailed description thereof taken in connection with the accompanying drawings which form a part of this disclosure, and in which:

FIG. 1 is an elevational view entirely in longitudinal section illustrating the flexible neck portion of a welding torch having a biasing arrangement in accordance with the instant invention, with the housing in a first position with respect to the body; and FIG. 2 is an elevational view, similar to FIG. 1, with the housing in the second position with respect to the body.

DESCRIPTION OF THE PREFERRED EMBODIMENT

With reference to FIG. 1, the flexible neck portion of a welding torch head in accordance with the invention is generally indicated by reference numeral 6. The torch 6 includes a body member 8 having external threads 10 provided adjacent one end 12 thereof. The body 8 is adapted for interconnection to a source of pressurized air and a source of electrical potential. To effect the former purpose a central axial bore 14 is provided through the body 8. The body 8 is fabricated of a suitable electrically conductive material which effectuates the latter purpose, that is, interconnection of the head 6 to a source of electrical potential. The manner of interconnection of the body to the source of pressurized air and electrical potential may be provided in any suitable expedient known to the art, such as, for example, as shown in the above mentioned U.S. Pat. No. 3,909,585. For reference purposes in the following discussion, a central axis 16 extends through the torch 6.

The torch 6 further includes a hollow housing 18 having a tubular portion 20 with a closure plate 22 being integrally disposed therewith. A central axial opening, or aperture, 24 is provided in the closure plate 22, the opening 24 being bevelled, as at 26, for a purpose to be described. An annular seating member 28 is disposed about the aperture 24 on the interior of the housing 18 to define a shoulder useful for a purpose made clearer herein. The end of the tubular portion 20 opposite the closure plate 22 is provided with internally disposed threads 30 adapted to interconnect the housing to the body. The housing 18 is thereby axially advanceable with respect to the body 8 from a first position (shown in FIG. 1) to a second, locked, position (shown in FIG. 2). Of course, any suitable means of interconnection may be utilized whereby the housing 18 is rendered axially advanceable from a first to a second position with respect to the body 8, and such means are construed to be within the contemplation of this invention. For example, radially inwardly extending pins may be provided on the interior of the housing 18 in the region of the threads 30 shown in FIG. 1. The pins may be received in axially extending slots on the exterior of the body. The slots may communicate with transverse channels which serve to receive the pins upon angular rotation of the housing and maintain the housing in a desired position with respect to the body. Other expedients apparent to those skilled in the art may also be utilized.

Movably disposed within the interior of the hollow housing 18 is a socket member 32 having a socket face 34 and an abutment face 36 provided on opposite sides thereof. The socket member 32 is disposed within the housing 18 such that the socket face 34 is presented in next-adjacency to and in communication with the aperture 24 in the closure plate 22. The abutment face 36 of the socket member 32 cooperates with the interior of the tubular portion 20 of the housing 18 and the end 12 of the body 8 to define a spring chamber 38 within the housing 18. An opening 40 extends centrally and axially through the socket member 32.

A ball member 42 having an elongated stem 44 integrally connected therewith is receivable within and rotatable with respect to the socket face 34 of the socket member 32 such that the stem 44 protrudes through the aperture 24 in the closure plate 22. The stem and ball are provided with a central axial passage 46 therethrough which is, at all times, in fluid communication with the opening 40 in the socket member 32. A portion of the surface of the ball and the socket face 34 cooperate to define a freely rotatable joint interface 48 on which the ball 42 may be moved so as to orient the stem 44 in any predetermined anuglar orientation with respect to the axis 16 of the torch 6.

It is appreciated that due to the protrusion of the stem 44 through the aperture 24 in the closure plate 22 the maximum angular deflection of the stem 44 from the axis 16 is limited by the dimension of the aperture 24. However, with the bevelled surface 26 being disposed about the aperture 24, it may be seen that the stem 44 may occupy any angular orientation lying within an envelope 52 having the shape of a truncated conical portion 54 closed by a spherical bottom 56. As seen in the Figures, the bevelled portion 26 is contained within the truncated conical portion 54 of the envelope 52 so defined. It may thus be appreciated that the ball 42 is freely rotatable along the interface 48 with the socket face 34, and the stem 44 may occupy any angular orientation with respect to the axis 16 lying within the envelope 52.

A biasing arrangement generally indicated by reference numeral 60 is disposed within the spring chamber 38 and is adapted to provide a biasing force acting in the direction 62 so as to place a portion of the surface of the ball 42 into abutting contact with the internal shoulders 28 disposed on the interior surface of the closure plate 22.

The biasing arrangement 60 is characterized in that it exhibits a relatively high compression-to-length ratio. By a relatively high compression-to-length ratio it is meant that a small axial displacement of the biasing arrangement 60 generates a relatively large increase in the compression force exerted thereby. Such an arrangement is believed best exemplified by an annular coned disc spring such as those commonly known as Belleville springs. Accordingly, the biasing arrangement 60 comprises at least one, but preferably a plurality, of Belleville springs 66A through 66D stacked in any appropriate configuration within the spring chamber 38 between the end 12 of the body 8 and the abutment face 36 of the socket member 32. Each Belleville spring 66 has a central aperture 68 extending therethrough. The apertures 68 communicate with the bore 14 and the opening 40 to provide a passage whereby pressurized gas may be conveyed from the source to the proximity of the welding surface.

When the housing 18 is engaged with the body 8 on the interconnected threads 10 and 30 so as to occupy the first position (indicated by reference character 69) with respect thereto, the dimensions of the spring chamber 38 are such that the Belleville biasing springs 66 exert a first biasing force acting on the socket member 32 in the direction 62. As a consequence, the ball 42 is biased into snug abutting contact with the seating member 28 to maintain the stem 44 in a selected angular orientation with respect to the axis 16 and within the envelope 52. That is to say, that portion of the surface of the ball 42 which abuts against the seating member 28 when the stem occupies a selected angular orientation with respect to the axis 16 of the torch is snugly maintained at an interface 70 against that member 28 such that the selected orientation of the stem 44 within the envelope is maintained. However, the friction force generated at the interface 70 between the seating member 28 and the ball 42 as a result of the first biasing force may be overcome such that the stem 44 is displacable from the given angular orientation in response to the application of an external force, as at 72, thereto.

In order to more securely maintain the stem 44 in a selected angular orientation with respect to the axis 16 of the torch 6, it is necessary to merely axially displace the the housing 18 relative to the body 8 from the first position 69 (FIG. 1) to the second position 74 (FIG. 2). Advancement of the housing 18 with respect to the body 8 from the first to the second position contracts the dimensions of the spring chamber 38. The Belleville springs 66 respond to the contraction of the spring chamber so occasioned by compressing to exert a second biasing force (greater than the first biasing force) acting in the direction 62 to bias the ball 42 into locked abutting contact with the seating member 28. It may be thus appreciated that a substantial increase in biasing force may be effected by a relatively slight displacement of the housing 18 with respect to the body 8. This follows from the high compression-to-length characteristic of the biasing arrangement 60 discussed above. Of course, the preferred mode of movement of the housing with respect to the body 8 is by progressive threaded advancement along the interconnected threads 10 and 30.

As a result of the increased biasing force acting in the direction 62, a greater frictional force is generated along the interface 70 between the portion of the surface of the ball 42 and the seating member 28. This increased frictional force securely locks the stem 44 in a selected angular orientation. When locked, the stem 44 will remain in the selected position despite the application of the external force 72 being applied thereto. Of course, to reorient the stem 44, the housing 18 need only be retreated with respect to the body 8, the converse of the operation described above.

It may be appreciated from the foregoing that since a suitable electrical conduction path is provided from the source of electrical potential through the interconnected body 8, housing 18, socket member 32, ball 42 and integral stem 44, it may be necessary to provide a suitable insulating sheath 78 over the torch.

It may also be seen that a welding torch head is provided whereby the stem thereof is permitted to flex and occupy any angular orientation with respect to the axis of the torch lying within a defined envelope. Further, through the provision of the Belleville spring biasing arrangement exhibiting a high compression-to-length ratio a relatively small advancement of the housing 18 with respect to the body 8 generates an increased biasing force to thereby lock and maintain the stem in a desired angular orientation.

Having described a preferred embodiment of the invention those skilled in the art may appreciate that numerous modifications may be effected thereto without departing from the scope of the invention as defined in the appended claims.

What is claimed is:

1. In a welding torch body adapted for interconnection at one end with a source of pressurized gas and a source of electrical potential and at the other end with a welding torch head, said body including a first conduit for passage of the gas therethrough and means for passing electric current therethrough, the improvement wherein said body comprises in combination:
    a ball having an elongated stem thereon for interconnection with the welding torch head, said ball and stem including a second conduit for passage of the gas therethrough;
    means for retaining the ball with respect to the body; and
    biasing means acting on the ball to maintain the stem in any angular orientation with respect to the axis of the body to which the stem is displaced, said biasing means including a disc spring disposed in the body, said disc spring defining an aperture communicating between said first conduit and said second conduit for passage of the gas therethrough.

2. The welding torch body of claim 1 wherein the biasing means includes a plurality of disc springs acting on the ball, each of said disc springs defining a central aperture for passage of the gas between the first conduit and the second conduit.

3. The welding torch body of claim 2 wherein the retaining means includes a housing attached to the torch body, said housing having an annular closure plate at one end thereof, the closure plate defining an aperture through which the stem extends.

4. The welding torch body of claim 3 wherein the biasing means includes a socket member movably disposed within the housing and defining a socket face abutting the ball, and the disc springs are disposed within the housing between the socket member and the torch body, said disc springs being compressed by movement of the housing onto the torch body to increase force required to change the orientation of the stem with respect to the axis of the torch body.

5. The welding torch body of claim 4 wherein the housing is threadedly connected to the body for relative advancement with respect thereto.

6. In a welding torch body adapted for interconnection at one end with a source of pressurized gas and a source of electrical potential and at the other end with a welding torch head, said body including a first conduit for passage of the gas therethrough and means for passing electric current from said interconnection to the welding torch head, the improvement comprising:
    a ball having an elongated stem thereon, said stem being adapted for interconnection with a welding torch head;
    a second conduit in the ball and stem for passage of the pressurized gas therethrough;
    a housing attached to the torch body, said housing having an annular closure plate at one end thereof defining an aperture through which the stem extends;
    a socket member disposed within the housing and defining a socket face abutting the ball;
    a plurality of disc springs disposed within the housing and abutting the socket member, each of said disc springs and the socket member having an aperture therethrough for passage of the gas between the first conduit and the second conduit.

7. The welding torch body of claim 6 wherein the housing is adjustably movable toward the body to increase the force required to change the angular orientation of the stem with respect to the axis of the body.

8. In a welding torch comprising in combination:
    a body portion adapted for interconnection with a source of pressurized gas and a source of electrical potential, said body portion including a first conduit for passage of the gas therethrough; and
    a head portion attached in electrical contact with the body portion and adapted to hold an electrode in electrical contact therewith, said head portion including a second conduit for passage of the gas from the body portion to an outlet proximate the electrode;
the improvement wherein said body portion includes
    a ball having an elongated stem thereon for attachment of the head portion thereto, said ball and stem being electrically conductive and defining an electrical connection between the head portion and the remainder of the body portion;
    a third conduit in the ball and stem for passage of the gas therethrough;
    a biasing arrangement associated with the ball and comprising an annular disc spring disposed to act on the ball to maintain the stem in any configuration to which said stem is displaced, said annular disc spring having a central aperture communicating between said first conduit and said third conduit for passage of the gas therethrough.

* * * * *